United States Patent

[11] 3,578,005

| [72] | Inventors | Roland Jurion<br>Bobigny;<br>Andre Leblanche, Saint-Denis, France |
|---|---|---|
| [21] | Appl. No. | 709,748 |
| [22] | Filed | Mar. 1, 1968 |
| [45] | Patented | May 11, 1971 |
| [73] | Assignee | Societe D'Etudes Chimiques pour<br>L'Industrie et L'Agriculture<br>Paris, France |
| [32] | Priority | Mar. 1, 1967 |
| [33] | | France |
| [31] | | 96908 |

[54] WATER TREATMENT APPARATUS
11 Claims, 2 Drawing Figs.
[52] U.S. Cl. .................................................. 137/3,
137/93, 137/205.5
[51] Int. Cl. ............................................. G05d 11/00
[50] Field of Search .......................................... 137/3, 5,
93, 101.11, 205.5, 268; 23/267

[56] References Cited
UNITED STATES PATENTS

| 2,604,446 | 7/1952 | Palmer | 137/268X |
| 3,481,355 | 12/1969 | Watson | 137/268X |
| 3,274,094 | 9/1966 | Klein | 137/101.11X |
| 3,433,259 | 3/1969 | Hiers | 137/599.1 |

Primary Examiner—Alan Cohan
Attorney—Miller, Raptes & White

ABSTRACT: A water treatment apparatus having a fluid mixing device for injecting an aqueous solution of a treating fluid into the water to be treated. Storage vessels for the treating fluid communicate with a dilution vessel for dilution of the treating fluid. Dilution water is transmitted to the device through valved lines communicating in parallel with the storage vessel and with the dilution vessel. A control is provided to alternately direct dilution water through the storage vessel to the dilution vessel or directly to the dilution vessel as determined by the chemical makeup of the water to be treated.

3,578,005

WATER TREATMENT APPARATUS

BACKGROUND OF THE INVENTION

This invention relates to water treatment apparatus and more particularly to a mixing device for such an apparatus to provide for the introduction of liquid bromine into the water to be treated.

Although this invention finds utility in any situation wherein the maintenance of a predetermined and substantially constant proportion of treating fluid in water is required, this invention is particularly adapted to injecting an aqueous solution of bromine into a water system requiring bromine treatment. As an example, this device may be used for introducing bromine into water circuits of swimming pools, refrigeration systems or into any other system which requires disinfection of water.

In slightly alkaline mediums such, for example, as swimming pool water, bromine and some brominated compounds have been found to have a bactericidal power greater than antiseptic chlorinated reagents such as chlorine, hypochlorite, etc. Furthermore, water treated by bromine, unlike that treated by chlorinated reagents, is characterized by an absence of unpleasant odors and irritation to mucous membranes. Bromine also has an advantage in such use in that it is a strong algicide. Since bromine, because of its caustic and volatile characteristics, is more difficult to handle in the liquid phase than chlorine, it has been common in the prior art to employ bromine for such purposes in the form of a solid, brominated compound such as bromochlorodimethyl hydantoin, tetramethylammonium dibromochloride etc., which compounds are easy to handle and give up bromine gradually when contacted with water, Although solving some of the problems of the use of liquid bromine, the solid products have the drawback of being much more expensive than bromine itself.

In order to make the use of liquid bromine for water treatment feasible, it is necessary that means for accurately and consistently regulating the amount of bromine introduced into the water be provided. This presents difficulties since bromine is a relatively heavy liquid which does not mix readily with water and is relatively slow to dilute into solution. Because of this, a suitable regulation and consistency has not been possible with direct injection of bromine into water. Injection of the bromine in the form of an aqueous solution would be one solution to this problem; however, due to the nature of aqueous solutions of bromine, they must be stored out of contact with the atmosphere, which requirement presents problems sufficiently difficult to have precluded, to a large extent, the practical use of bromine for water treatment.

SUMMARY OF THE INVENTION

This invention provides a novel device which overcomes the disadvantages of the prior art by furnishing a means to continuously prepare, on demand, an aqueous solution of a relatively dense, water treating liquid in sufficiently diluted form to be introducible directly into the water to be treated. Although the invention will hereinafter be specifically described as applied to dilution of liquid bromine, it should be understood that the invention is equally applicable to dilution of other liquids having similar properties.

The invention also provides a means for automatically controlling the preparation of an aqueous solution of bromine in such a manner that the solution may be injected according to a predetermined program and/or under the control of the bromine content of the water to be treated.

The invention also provides an effective and safe means for preparation and injection of aqueous solutions of bromine into water.

In a preferred embodiment, the device comprises at least one storage vessel for containing liquid bromine and a dilution vessel communicative therewith. Circulation of dilution water and brominated water to the dilution vessel is regulated by at least two valves, one of which controls introduction of dilution water into the storage vessel and, subsequently, introduction of brominated dilution water into the dilution vessel, while the other of the valves controls the introduction of dilution water into the dilution vessel and injection of the resultant highly diluted bromine solution from the dilution vessel into the water to be treated.

These and other objects of the invention will become better understood by reference to the following detailed description when viewed in light of the accompanying drawings wherein like components throughout the FIGS. thereof are indicated by like numerals and wherein:

DESCRIPTION OF THE PREFERRED EMBODIMENT

As used hereinafter, "brominated water" is intended to mean an aqueous solution containing a quantity of bromine between about 1 gram per liter and saturation, and preferably 10 to 30 grams per liter of bromine. By "highly diluted bromine solution," an aqueous solution containing not more than 100 milligrams per liter of bromine is intended.

Figure 1:
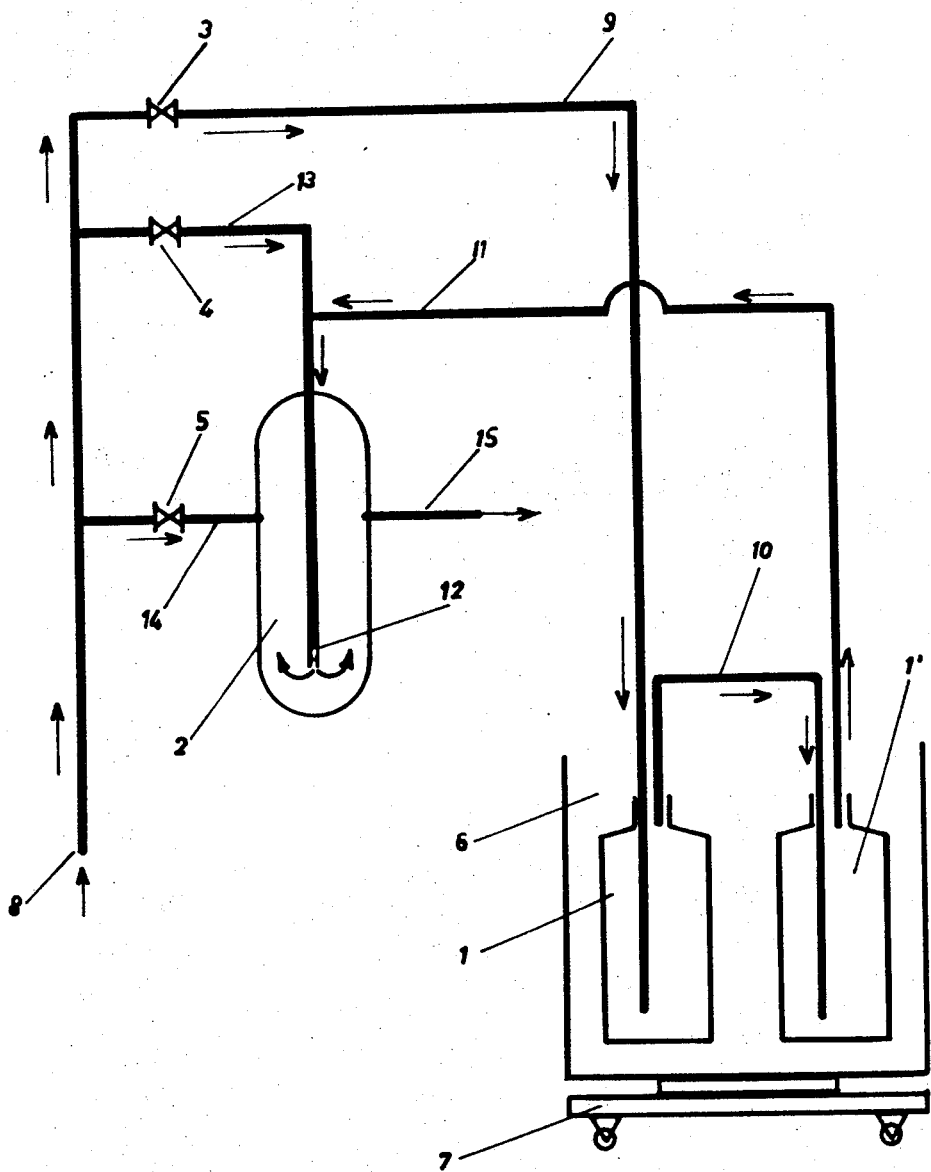
FIG. 1 is a schematic view of a fluid mixing device in accordance with the invention.

Referring now to FIG. 1 of the drawings, the injection device comprises two bottles, 1 and 1', for storing liquid bromine, an elongated dilution vessel 2 having upper and lower zones, and valves 3, 4 and 5.

The elongated bottles 1 and 1' having upper and lower zones are disposed in a vat 6 which is filled with water to immerse the bottles for purposes of safety. The bottles 1 and 1' preferably comprise packages similar to those described in applicant Roland Jurion's copending application Ser. No. 709,592, filed Feb. 27, 1968, now U.S. Pat. No. 3,501,055. In order to facilitate replacement of the bottles 1 and 1', the vat 6 is preferably mounted on a rotating tray 7.

An inlet conduit 8 communicates with a bottle feed conduit 9 through the valve 3, the feed conduit extending into the lower zone of bottle 1 as illustrated. A transfer tube 10 interconnects the bottles 1 and 1' and, as illustrated, provides communication between the upper zone of the bottle 1 and the lower zone of the bottle 1'. A tube 11 communicates the upper portion of the bottle 1' with a plunging tube 12 which, in turn, communicates with the lower zone of the dilution vessel 2.

In connection with the storage means, it is possible to utilize a single bottle or eliminate, for example, the transfer tube 10 and the bottle 1'; however, it has been found that with two vessels the desired bromine content of the brominated water can be maintained within a narrower range than with one bottle because, with one bottle, the bromine content fluctuates markedly as the bottle empties.

The inlet conduit 8 is also communicative with the dilution vessel 2 through conduits 13 and 14 and the valves 4 and 5 respectively. The former conduit enters the vessel through the plunging tube 12 while the latter enters the vessel substantially at the midpoint or normal fluid level thereof. An exhaust conduit 15 provides an outlet for the dilution vessel 2.

The inlet conduit 8 is connected to a source of diluting water and, when the valve 3 is opened, dilution water flows through the feed conduit 9 to the bottom of the first bromine bottle 1. An amount of brominated water equivalent to the amount of dilution water introduced into the bottle 1 is expelled into the bottle 1', through the transfer tube 10 and then into the dilution vessel 2 through the tubes 11 and 12.

Actuation of the valves is phased in such a manner that the valves 4 and 5 close when the valve 3 is opened and vice versa. The valves 4 and 5 preferably open simultaneously so that dilution water is introduced directly into the vessel 2 at two different levels.

When the valve 4 is opened, dilution water is transmitted through the conduit 13 into the plunging tube 12 to effect a first dilution of the brominated water which, as it comes from the bottle 1' with a high bromine content, tends to remain at the bottom of the vessel 2 due to the higher density thereof. The simultaneous opening of the valve 5 transmits dilution water to the vicinity of the liquid level in the vessel 2 through the conduit 14 to further dilute the brominated water just prior to entry thereof into the exhaust conduit 15 for transfer to the water to be treated. This two-fold dilution results in solutions containing less than 100 milligrams per liter of bromine in the exhaust conduit 15, thereby preventing the concentration of bromine from exceeding 5 milligrams per liter at the point where the bromine solution is to be injected and thereby provides a very reliable operation while avoiding danger of corrosion.

Although the use of dual valves 4 and 5 provides regular water circulation and very effective dilution, it is to be understood that two-level feed of dilution water to the dilution vessel can also be accomplished through a single valve if so desired. Likewise the two-level feed of dilution water can be obtained by any suitable means other than the plunging tube 12, for instance by means of an inlet conduit entering the dilution vessel at the bottom.

Manual valves (not shown) or any other device serving a similar purpose can be used to regulate the flow rate through the conduits 9, 13 and 14 if desired. In addition, check valves (not shown) can be disposed in the conduits 9, 13 and 14 downstream of the valves 3, 4 and 5 to avoid accidental backflow of brominated water into the conduit 8 if so desired.

Preferably the valves 3, 4 and 5, as well as any other valves which may be necessary in the system, are electrically actuated by means such as solenoids or the like. Such actuation can also be accomplished by other means such, for example, as by pneumatics, hydraulics or the like, if desired. According to a particularly simple and economical use of the device, the operation of the valves is effected at predetermined periods and intervals by the use of an electrical programming device which can be regulated either manually according to the requirements of the water to be treated or by means of a timing mechanism. Thus, for example, in the treatment of swimming pool water, the frequency and/or strength of bromine injections can be increased manually when the number of swimmers is high and, conversely, reduced when there are few or no swimmers. A timing mechanism can also be provided to automatically stop or decrease injections of bromine during the time the swimming pool is normally closed.

When the source of treater water provides in the inlet conduit 8 a pressure sufficiently high to overcome the pressure drop in the injection circuit of the treating fluid, dual valves 4 and 5 are advantageously replaced by a single reducing valve which is, for example, a self-operated pressure regulator. The valve opening of such a regulator depends on the interaction of the downstream pressure on a diaphragm and the force of an opposing loading spring, the adjustment of the spring adjusting the control point.

Therefore the use of a pressure regulator simplifies the circulation path of diluting water which can then flow continuously through the dilution vessel and intermittently through the storage bottles instead of flowing alternatively through the dilution vessel and through the storage bottles.

According to another feature of this invention, the treating fluid content of the treated water is continuously measured and this measurement is used to signal an electromechanical or electronic system which, in turn, actuates the injection device valves or valve to vary the frequency and/or strength of injections. According to a preferred embodiment, and assuming bromine as the treating fluid, the bromine content is measured by a known method such as by using a cell forming a pile delivering a current, the intensity of which is proportional to the quantity of residual bromine present in the water.

Several types of cells can be used such as, for example, cells similar to those described in U.S. Pat. No. 2,076,964 of Apr. 13, 1967 or in U.S. Pat. No. 2,585,060 of Feb. 12, 1952.

The cell in this instance works according to the same principle of that described in U.S. Pat. No. 2,585,060 but it is much simpler for an electrode-cleaning arrangement is not necessary in the present case. This cell comprises a cylindrical shell made of opaque nonconducting material and provided with an inlet conduit for the continuous introduction of the water to be analyzed and an outlet conduit for the continuous discharge of this water. The shell contains a porous cartridge on which is coiled a platinum wire electrode immersed in the bromine solution to be analyzed. A reference electrode such, for example, as a silver wire is placed centrally in the cartridge and immersed in a saturated and jellified sodium chloride solution.

The above cell can be applied to this invention as follows:

A predetermined amount of sample water, taken from the water to be treated, is passed continuously through the cell at a controlled flow rate. Prior to entry into the cell, potassium iodide and a buffer solution are added to the sample water. The buffer solution is added to maintain the pH of the mixture at a suitable value to enable liberation of iodine from the potassium iodide as will be described below. A suitable pH for such purposes would be, for example, in the vicinity of 4 and could be achieved by adding 25 ml. per hour of a buffer solution comprising an aqueous solution containing per liter 480 g. of acetic acid and 243 g. of sodium acetate to the same water flowing at a rate of 100 l. per hour. For the purposes of this invention 25 ml. of an aqueous solution containing 7.5 g. of potassium iodide per liter, for example, is suitable for proper liberation of iodine from the solution.

The current delivered by the above-described cell has an intensity proportional to the amount of bromine which liberates iodine from the potassium iodide. The liberated iodine is reduced on the platinum electrode.

A cell still simpler which does not necessitate any addition of potassium iodide and buffer solutions can also be used. It comprises a cylindrical shell provided with inlet and outlet conduits for the circulation of the solution to be analyzed. The platinum electrode (coiled wire or plates) is disposed centrally and the reference electrode which is, for example, a cylinder made of a thin silver sheet is placed around, the two electrodes being immersed in the circulating solution to be analyzed.

The current delivered by the cell is amplified and used to signal an electromechanical or preferably electronic system to open the valves of the invention device for variable periods of time, that is, for increasing or decreasing periods of time as determined by the deviation in the bromine content of the water to be treated from the desired content. The current also serves to continuously indicate the bromine content of the treated water. For this purpose a visual dial indicator generally will be found suitable, but in some cases a continuous recording system may be desired.

In order to give a better understanding of the use of the bromine injection device described hereinabove, details of its operation are now shown in a complete unit with continuous control and automatic regulation of the bromine content of swimming pool water. It should nevertheless be understood that the use as a treatment device for swimming pool water is given by way of example and that the bromine injection device can be used in a similar fashion whenever it is desired to introduce very small and regulated quantities of bromine into any water circuit. The usual regulations for sanitation control in swimming pools and other swimming places, include several requirements, i.e.: constant circulation of water with recycling and filtration, cleansing of the recycle water; daily renewal of a given portion of the recycled water, e.g. at least equal to 10 percent of the swimming pool volume; addition of an antiseptic at a nonirritating concentration to prevent bacterial growth; periodic cleaning and draining of the pool; and a minimum volume of water per swimmer.

Figure 2:
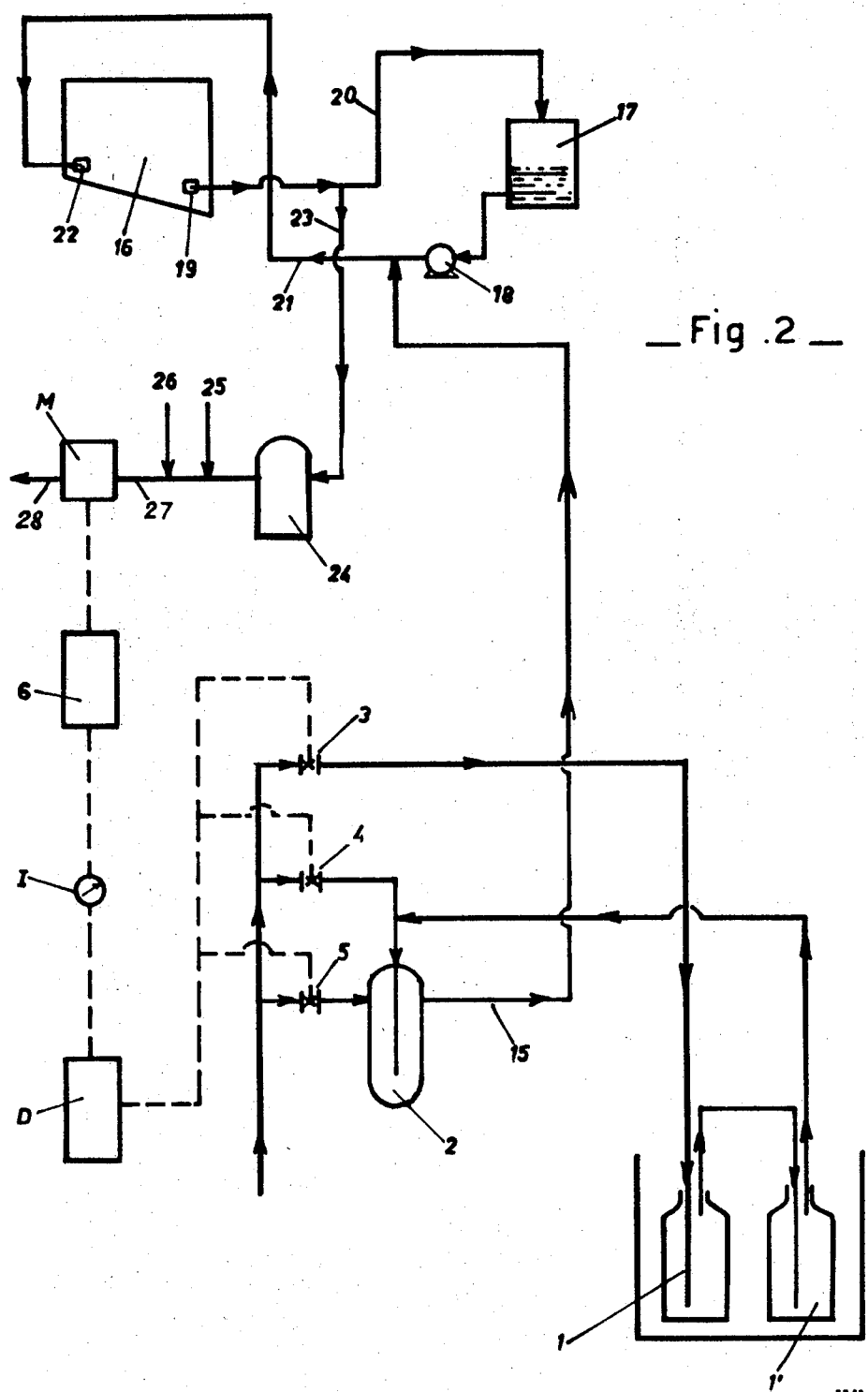
FIG. 2 is a schematic view of a fluid injecting apparatus incorporating the mixing device of FIG. 1.

The unit shown in FIG. 2 comprises a swimming pool 16 and a water recycling circuit having a filter 17 such, for example, as a sand filter. The circulation of water in the recycling circuit is effected by means of a pump 18 placed at the exit of the filter in order to maintain a slightly reduced pressure therein. It is also possible to dispose the pump upstream of the filter in order to maintain a positive pressure therein if so desired. The water is aspirated at the bottom and at one end of the pool through an intake 19 and is transmitted to the filter 17 through a conduit 20. Water leaves the filter through the conduit 21 and is transmitted back through a return 22 disposed at the other end of the pool to promote a suitable water circulation in the pool itself.

The above-described pool system is illustrated as typical of a circulating and filtration system for swimming pools to illustrate the points and manner of connection of the bromine injection device of FIG. 1 or the control system to be described hereinafter. It should be understood, however, that the control system and injection device may be suitably connected to any type of recycling circuit for swimming pools.

As illustrated in FIG. 2, the exhaust conduit 15 from the dilution chamber 2 of the injection device is connected to the conduit 21 of the recirculating system of the pool downstream of the pump 18. A conduit 23 branches off from the conduit 20 of the recirculating system and communicates with a reservoir 24 for which means are provided to maintain a constant fluid level therein. The reservoir 24 is communicative with a cell M through a conduit 27. The sample fluid passes through the cell M and is discharged through an exhaust 28. The potassium iodine solution and buffer solution are injected in the conduit 27 upstream of the cell M at 25 and 26, respectively.

As was described above, the cell M generates a current which is transmitted to a direct current amplifier G of any type suitable for the purpose. The amplified current is transmitted to a galvanometer I for continuous indication of the bromine content of the sample water as a function of the current generated by the cell M. The galvanometer used can be any commercial apparatus provided with contacts which are sequentially closed upon deflection of the galvanometer indicator to energize electrical circuits. The contacts may be optical, for example obtained by means of a photo-resistant cell, or electromagnetic.

An apparatus such as the galvanometer commercialized under the name REGLINDEX D is particularly suitable for the use with the device of the invention. In this apparatus, the indicator needle is provided with an aluminum plate and one or several adjustable set points can be positioned on the scale of the indicator. Each arm supporting a set point is equipped with a transistorized oscillator which is locked by the passage of the plate between its resonance and reaction coils when the needle arrives under the corresponding set point. The current coming from each electronic circuit actuates a reversing relay.

The galvanometer I energize circuits to a cyclic dosimeter D which is a time switch such as, for example, that described in U.S. Pat. No. 2,980,855 of Apr. 18, 1961.

It should be understood that other suitable electronic devices or electromechanical systems may be substituted for the dosimeter specifically described if so desired.

With suitable interconnection to dispose the valves 4 and 5 open when the valve 3 is closed and vice versa and, assuming that the dosimeter D is provided with three positions, e.g. "-strong injection rhythm," "weak injection rhythm" and "-stop," regulation of the system is achieved as follows:

1. When the bromine content of the water in the swimming pool 16 as reflected by the sample water in the conduit 27 and sensed by the cell M, falls below a desired value such as when there is a large number of swimmers in the pool, for example, the signal from the galvanometer I will place the cyclic dosimeter D into the "strong injection rhythm" position. In this position the dosimeter functions to open the valve 3 for relatively long periods of time at relatively small intervals. As an example, during the "strong injection rhythm" cycle, the valve 3 will remain open for 5 seconds at intervals of 5 seconds, thereby transmitting an aqueous solution of bromine from the bottle 1' to the dilution chamber 2 for 5 seconds followed by closing the valve 3 and opening the valves 4 and 5 for transmission of diluting water to the dilution chamber 2 for intervals of 5 seconds.

2. When the bromine content of the swimming pool water reaches the required value, the galvanometer I then places the cyclic dosimeter D into the "weak injection rhythm" position. In this configuration, the dosimeter, through its timing mechanism, opens the valve 3 for relatively short periods of time at relatively large intervals. For example, the dosimeter can be set to hold the valve 3 open for one second periods at intervals of 60 seconds, thereby transmitting an aqueous solution of bromine from the bottle 1' to the dilution chamber 2 for periods of one second while dilution water flows through the valves 4 and 5 for intervening periods of 60 seconds.

3. When the bromine contents of the swimming pool water exceeds the required value, due to a low number or absence of swimmers in the pool, for example, the galvanometer I places the cyclic dosimeter D in the "stop" position and the valve 3 remains closed with the valves 4 and 5 open. In this manner, no aqueous bromine is injected into the dilution chamber 2 so long as the dosimeter remains in the "stop" configuration.

With the device as illustrated in FIG. 2 incorporated in a pool having a volume of approximately 300 cubic meters, tests have indicated that the bromine content of the water may be maintained at 0.2 parts per million within limits of plus or minus 0.05 parts per million. The preparation of the aqueous solution and the dilution of the bromine is achieved with the water derived from the normal city water supply system comprising part or all of the required replenishment of the swimming pool water.

If so desired, a timer for recording the accumulated time that the valve 3 is in an open condition, can be incorporated in the system to thereby reflect the total antiseptic consumption in the pool.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

We claim:

1. A water treatment apparatus having a fluid mixing device comprising:
   at least one storage bottle for containing a relatively dense fluid;
   a dilution vessel communicative with said storage bottle, said dilution vessel having a fluid outlet therein;
   a water inlet conduit;
   first means including a valve providing controlled communication between said inlet conduit and said storage bottle; and
   second means comprising two valve conduits, each of said conduits providing communication between said inlet conduit and different levels of said dilution vessel.

2. A device in accordance with claim 1 wherein said valves are electrically actuated.

3. A device in accordance with claim 2 wherein control means are provided to actuate the valve of said first means and the vales of said second means to opposite positions simultaneously so that the valves of said second means are closed to block flow therethrough when the valve of said first means is open and the valve of said first means being closed to block flow therethrough when the valves of said second means are opened.

4. A device in accordance with claim 3 wherein said control means is manually operated.

5. A device in accordance with claim 3 further including a timer means to operate said control means according to a predetermined schedule.

6. A device in accordance with claim 3 wherein said relatively dense fluid comprises liquid bromine and wherein the aqueous bromine mixture from said device is communicative with a treated liquid cycle, a sensing means disposed in communication with said treated liquid cycle for continuous monitoring of the bromine content thereof, said sensing means being connected to said control means for operation thereof to actuate said valves for regulation of the amount of bromine transmitted to said treated liquid cycle to maintain a predetermined constant bromine level therein.

7. A device in accordance with claim 6 in which said sensing means comprises a fluid sample takeoff communicative with said treated liquid cycle, means to inject potassium iodine and a buffer solution into the sample fluid, a platinum electrode disposed in the resultant sample fluid, and a silver wire electrode disposed in a saturated jellified sodium chloride solution to serve as a reference electrode for said cell.

8. A device in accordance with claim 1 wherein said second means comprises a single reducing valve.

9. A device in accordance with claim 8 wherein said reducing valve is a self-operated pressure regulator.

10. A process for introducing bromine into swimming pools, which process comprises the steps of:
   a. passing inlet water into at least one bromine storage vessel;
   b. withdrawing from a bromine storage vessel brominated water and passing the latter to a bromine dilution vessel;
   c. passing inlet water into said bromine dilution vessel at different levels thereof to further dilute said brominated water; and
   d. withdrawing from said dilution vessel diluted brominated water.

11. A process as defined by claim 10, wherein diluted brominated water having a concentration of not more than 100 mg/l. is withdrawn from said dilution vessel.